(12) United States Patent
Winkler

(10) Patent No.: US 10,287,990 B2
(45) Date of Patent: May 14, 2019

(54) BLEED SYSTEM BOLTED DUCT WITH RECESSED SEALS

(71) Applicant: ROHR, INC., Chula Vista, CA (US)

(72) Inventor: Richard Winkler, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1056 days.

(21) Appl. No.: 14/455,634

(22) Filed: Aug. 8, 2014

(65) Prior Publication Data

US 2016/0040810 A1    Feb. 11, 2016

(51) Int. Cl.
| | |
|---|---|
| *F16L 21/08* | (2006.01) |
| *F16L 21/04* | (2006.01) |
| *F16L 23/20* | (2006.01) |
| *F02C 7/28* | (2006.01) |
| *F16L 17/08* | (2006.01) |
| *F16L 23/24* | (2006.01) |
| *F01D 11/00* | (2006.01) |
| *F02C 6/08* | (2006.01) |

(52) U.S. Cl.
CPC .............. *F02C 7/28* (2013.01); *F01D 11/005* (2013.01); *F02C 6/08* (2013.01); *F16L 17/08* (2013.01); *F16L 23/20* (2013.01); *F16L 23/24* (2013.01); *F05D 2240/55* (2013.01); *F05D 2260/60* (2013.01); *F16L 21/04* (2013.01); *F16L 21/08* (2013.01)

(58) Field of Classification Search
CPC .......... F02C 7/28; F01D 11/005; F16L 17/08; F16L 23/18; F16L 23/20; F16L 23/24; F16L 23/036; F16L 23/02; F16L 23/024; F16L 23/032; F16J 15/02; F16J 15/06; F16J 15/062; F16J 15/021; F16J 15/022; F16J 15/10; F16J 15/102; F16J 15/104; F16J 15/106; F16J 15/08; F16J 15/0881; F16J 15/0887
See application file for complete search history.

(56) References Cited

U.S. PATENT DOCUMENTS

| | | | | |
|---|---|---|---|---|
| 1,514,052 A | * | 11/1924 | Kaiser ................... | F16L 23/20 285/330 |
| 1,821,866 A | * | 9/1931 | Wilson ................... | F16L 23/20 277/614 |
| 1,851,143 A | * | 3/1932 | Wilson ................... | F16L 19/12 285/334.1 |

(Continued)

FOREIGN PATENT DOCUMENTS

GB          1494200 A  * 12/1977  ............. F16J 15/121

*Primary Examiner* — Todd E Manahan
*Assistant Examiner* — Eric Linderman
(74) *Attorney, Agent, or Firm* — Snell & Wilmer L.L.P.

(57) ABSTRACT

A first duct segment may include a first flange including a first planar mating face and a first recess. A second duct segment may include a second flange including a second planar mating face and a second recess. The first duct segment and the second duct segment may be installed in a gas turbine engine. A first E-seal may be inserted in the first recess, and a second E-seal may be inserted in the second recess. A gap may be measured between the first flange and the second flange. A flat shim may be selected based on the size of the gap. The flat shim may be inserted between the first flange and the second flange. A plurality of bolts may be inserted through the first flange, the flat shim, and the second flange to seal the first duct segment to the second-duct segment.

15 Claims, 6 Drawing Sheets

(56) References Cited

U.S. PATENT DOCUMENTS

| | | | | |
|---|---|---|---|---|
| 1,853,168 A * | 4/1932 | Murphy | F16L 21/04 | 285/342 |
| 1,869,577 A * | 8/1932 | Oberhuber | F16L 17/08 | 277/608 |
| 1,873,855 A * | 8/1932 | Wilson | F16L 23/20 | 220/327 |
| 1,978,019 A * | 10/1934 | Haushalter | F16L 23/125 | 138/141 |
| 1,979,141 A * | 10/1934 | Clark | F16L 21/04 | 188/204 R |
| 2,067,428 A * | 1/1937 | Wallis | F16L 17/04 | 137/217 |
| 2,291,709 A * | 8/1942 | Goetze | F16J 15/008 | 277/614 |
| 2,403,364 A * | 7/1946 | Hertzell | F16L 17/00 | 220/681 |
| 2,687,229 A * | 8/1954 | Laurent | F16L 17/08 | 220/240 |
| 2,832,615 A * | 4/1958 | Summers | F16L 21/08 | 285/342 |
| 2,900,199 A * | 8/1959 | Logan | F16L 23/18 | 277/614 |
| 3,078,332 A * | 2/1963 | Marx | F16L 25/01 | 174/77 R |
| 3,124,366 A * | 3/1964 | Hillman | F16J 15/022 | 277/612 |
| 3,213,187 A * | 10/1965 | Kish | F16L 21/04 | 174/78 |
| 3,215,166 A * | 11/1965 | Meinecke | F16J 15/0881 | 138/90 |
| 3,305,250 A * | 2/1967 | Hall | F16J 15/0881 | 277/614 |
| 3,317,224 A * | 5/1967 | Kuskevics | F16L 23/20 | 220/378 |
| 3,329,447 A * | 7/1967 | Hitz | F16L 17/06 | 138/89 |
| 3,398,978 A * | 8/1968 | Gasche | F16L 23/24 | 285/187 |
| 3,507,506 A * | 4/1970 | Tillman | F16L 23/20 | 277/614 |
| 3,514,133 A * | 5/1970 | Besse | F16L 19/0218 | 285/336 |
| 3,575,432 A * | 4/1971 | Taylor | F16J 15/0893 | 277/616 |
| 3,594,023 A * | 7/1971 | Yano | F16L 21/08 | 285/337 |
| 3,611,248 A * | 10/1971 | Turner | F16L 25/01 | 285/369 |
| 3,662,975 A * | 5/1972 | Driskill | B64D 41/00 | 244/58 |
| 3,915,482 A * | 10/1975 | Fletcher | F16L 27/0857 | 285/226 |
| 3,955,834 A * | 5/1976 | Ahlrot | B21D 39/00 | 285/110 |
| 4,049,296 A * | 9/1977 | Harrison | F16L 55/175 | 138/99 |
| 4,171,142 A * | 10/1979 | Harrison | F16L 55/175 | 138/99 |
| 4,209,029 A * | 6/1980 | Pennington | F16L 55/175 | 137/15.11 |
| 4,272,109 A * | 6/1981 | Ahlstone | F16L 23/18 | 277/609 |
| 4,316,053 A * | 2/1982 | Rieffle | F16L 21/04 | 174/84 S |
| 4,406,467 A * | 9/1983 | Burger | F16L 25/026 | 277/614 |
| 4,406,481 A * | 9/1983 | Summerell | F16L 55/172 | 137/15.09 |
| 4,452,462 A * | 6/1984 | Karr, Jr. | F16J 15/0887 | 277/614 |
| 4,506,919 A * | 3/1985 | Peting | F16L 21/08 | 285/231 |
| 4,516,797 A * | 5/1985 | Meinig | F16L 23/04 | 285/363 |
| 4,544,188 A * | 10/1985 | Dugger | F16L 23/032 | 285/337 |
| 4,568,091 A * | 2/1986 | Harrison | F16L 23/167 | 277/616 |
| 4,576,401 A * | 3/1986 | Harrison | F16L 55/175 | 138/99 |
| 4,643,463 A * | 2/1987 | Halling | F16L 27/0857 | 285/226 |
| 4,645,244 A * | 2/1987 | Curtis | F16L 27/0857 | 285/114 |
| 4,647,083 A * | 3/1987 | Hashimoto | F16L 25/065 | 285/321 |
| 4,711,426 A * | 12/1987 | Bodnar | F16L 21/08 | 251/151 |
| 4,776,600 A * | 10/1988 | Kohn | F16L 25/026 | 277/611 |
| 4,867,490 A * | 9/1989 | Arnoldt | F16L 23/08 | 285/367 |
| 4,871,181 A * | 10/1989 | Usher | F01N 13/1811 | 277/627 |
| 5,135,270 A * | 8/1992 | Arnoldt | F16L 23/08 | 285/363 |
| 5,174,615 A * | 12/1992 | Foster | F16L 23/16 | 285/334.2 |
| 5,203,593 A * | 4/1993 | Brandener | F01N 13/1811 | 267/147 |
| 5,213,374 A * | 5/1993 | Keating | F16L 21/022 | 228/17.5 |
| 5,316,320 A * | 5/1994 | Breaker | F16L 23/18 | 277/611 |
| 5,333,919 A * | 8/1994 | Nerenberg | F16L 23/18 | 285/363 |
| 5,368,069 A * | 11/1994 | Felber | F16K 15/038 | 137/512.1 |
| 5,398,980 A * | 3/1995 | Hunter | F16L 21/04 | 285/337 |
| 5,427,386 A * | 6/1995 | Breaker | F16J 15/008 | 277/608 |
| 5,437,482 A * | 8/1995 | Curtis | F16L 23/028 | 285/148.13 |
| 5,516,122 A * | 5/1996 | Caffee | F16J 15/062 | 277/614 |
| 5,518,257 A * | 5/1996 | Breaker | F16J 15/127 | 277/612 |
| 5,564,715 A * | 10/1996 | Wallace | F16J 15/127 | 277/612 |
| 5,730,445 A * | 3/1998 | Swensen | F16J 15/0887 | 277/608 |
| 5,803,513 A * | 9/1998 | Richardson | F16L 21/08 | 285/337 |
| 5,851,109 A * | 12/1998 | Reynolds | F04B 43/0081 | 417/395 |
| 5,884,946 A * | 3/1999 | Esser | F16L 23/02 | 285/16 |
| 6,142,483 A * | 11/2000 | Bryant, III | F16J 15/122 | 277/598 |
| 6,168,210 B1 * | 1/2001 | Bird | F16L 21/04 | 285/337 |
| 6,179,339 B1 * | 1/2001 | Vila | F16J 3/047 | 277/618 |
| 6,260,853 B1 * | 7/2001 | Carr | F16J 15/061 | 277/609 |
| 6,290,237 B1 * | 9/2001 | Graupner | F16L 23/18 | 277/603 |
| 6,299,178 B1 * | 10/2001 | Halling | F16J 15/0887 | 277/644 |
| 6,299,216 B1 * | 10/2001 | Thompson | F16L 23/167 | 277/318 |
| 6,409,180 B1 * | 6/2002 | Spence | F16J 15/0881 | 277/608 |
| 6,467,814 B1 * | 10/2002 | Wivagg | F16L 37/133 | 285/140.1 |
| 6,588,761 B2 * | 7/2003 | Halling | F16J 15/0887 | 277/312 |

(56) References Cited

U.S. PATENT DOCUMENTS

| | | | | |
|---|---|---|---|---|
| 6,869,081 B1* | 3/2005 | Jenco | F16L 23/003 | 277/611 |
| 6,948,717 B1* | 9/2005 | Carr | F16L 23/167 | 277/609 |
| 7,722,092 B2* | 5/2010 | Kim | F16L 21/06 | 285/364 |
| 8,191,933 B2* | 6/2012 | Rao | F16J 15/104 | 277/608 |
| 8,511,975 B2* | 8/2013 | Shi | F01D 25/246 | 415/173.1 |
| 8,782,866 B2* | 7/2014 | Anderson, III | F16D 1/05 | 29/407.1 |
| 9,109,732 B2* | 8/2015 | Vu | F16L 23/18 | |
| 9,281,084 B2* | 3/2016 | Philippart | F04D 29/628 | |
| 9,506,592 B2* | 11/2016 | Turnau, III | F16L 37/144 | |
| 9,890,859 B2* | 2/2018 | Veiga | F16J 15/065 | |
| 2002/0030326 A1* | 3/2002 | Bettencourt | F16J 15/065 | 277/602 |
| 2002/0163193 A1* | 11/2002 | Abuellel | F16L 47/12 | 285/337 |
| 2005/0001423 A1* | 1/2005 | Vila | F16J 15/3212 | 285/223 |
| 2006/0008352 A1* | 1/2006 | Segletes | B23K 9/18 | 416/244 A |
| 2006/0162326 A1* | 7/2006 | Nakagawa | F01N 13/1805 | 60/322 |
| 2007/0007768 A1* | 1/2007 | Ho | F16L 23/0283 | 285/368 |
| 2007/0176373 A1* | 8/2007 | Suggs | F16L 23/18 | 277/633 |
| 2007/0216109 A1* | 9/2007 | Friedow | F01N 13/1827 | 277/593 |
| 2008/0042370 A1* | 2/2008 | Zurfluh | C21D 6/001 | 277/591 |
| 2008/0080080 A1* | 4/2008 | Armstrong | F16J 12/00 | 359/894 |
| 2010/0044972 A1* | 2/2010 | Vila | F16J 15/3212 | 277/612 |
| 2010/0059988 A1* | 3/2010 | Matsumoto | F16L 17/073 | 285/148.28 |
| 2010/0127461 A1* | 5/2010 | Putch | F16L 17/06 | 277/314 |
| 2010/0201074 A1* | 8/2010 | Haynes | F16J 15/441 | 277/361 |
| 2010/0276895 A1* | 11/2010 | Taylor | F16J 15/062 | 277/608 |
| 2011/0052384 A1* | 3/2011 | Shi | F01D 9/04 | 415/200 |
| 2011/0210543 A1* | 9/2011 | German | F16L 21/04 | 285/330 |
| 2013/0285369 A1* | 10/2013 | Gjerstad | E21B 33/043 | 285/119 |
| 2013/0300106 A1* | 11/2013 | French | F16L 27/0857 | 285/237 |
| 2014/0205429 A1* | 7/2014 | Harwell | F16L 23/18 | 415/1 |
| 2014/0375051 A1* | 12/2014 | Ikushima | F16L 15/106 | 285/363 |
| 2015/0021863 A1* | 1/2015 | Wang | F16L 23/20 | 277/614 |
| 2015/0089929 A1* | 4/2015 | Pister | F01N 3/208 | 60/295 |
| 2015/0102566 A1* | 4/2015 | Hanumanthan | F01D 11/005 | 277/591 |
| 2015/0159755 A1* | 6/2015 | Whitlow | F16J 15/0887 | 277/611 |
| 2015/0276105 A1* | 10/2015 | Bander | F16L 23/18 | 285/368 |
| 2016/0003384 A1* | 1/2016 | Fischer | F16L 23/14 | 285/363 |
| 2016/0003385 A1* | 1/2016 | Koves | F16L 23/20 | 277/611 |
| 2016/0102793 A1* | 4/2016 | Shimizu | F16L 23/02 | 285/368 |
| 2016/0348817 A1* | 12/2016 | Veiga | F16L 23/20 | |
| 2016/0377208 A1* | 12/2016 | Holmes, IV | F16L 23/22 | 285/355 |
| 2017/0009918 A1* | 1/2017 | Koves | F16L 23/20 | |
| 2017/0227152 A1* | 8/2017 | Tyburcy | F02C 7/32 | |
| 2017/0363234 A1* | 12/2017 | Britt, Jr. | F16L 23/18 | |

\* cited by examiner

BLEED SYSTEM BOLTED DUCT WITH RECESSED SEALS

FIELD

The disclosure generally relates to gas turbine engines. More particularly, the disclosure relates to bolted duct joints in a gas turbine engine.

BACKGROUND

Modern aircraft may utilize one or more gas turbine engines. High pressure air from a compressor section of the engine may be directed through bleed ducts to various parts of the engine and the aircraft. The ducts may be subjected to high temperatures and pressures. The ducts may experience thermal growth, deflections during flight. Also, during assembly it may be difficult to fit adjacent segments of a duct together due to manufacturing and assembly tolerance stack-ups.

SUMMARY

A duct joint may comprise a first duct segment, a second duct segment, a flat shim, a first seal, and a second seal. The first duct segment may include a first flange. The first flange may have a first recess. The second duct segment may include a second flange. The second flange may have a second recess. The flat shim may be located between the first flange and the second flange. The first seal may be located in the first recess. The second seal may be located in the second recess.

In various embodiments, the first seal may be in contact with a recessed face of the first flange and a first planar face of the flat shim. The second seal may be in contact with a recessed face of the second flange and a second planar face of the flat shim. The first seal and the second seal may comprise E-seals. A thickness of the first flange may correspond to a gap between the first flange and the second flange. The first duct segment and the second duct segment may be coupled to an engine case in a gas turbine engine. The flat shim may comprise a nickel-chromium-based superalloy. A first mating surface of the first flange may be in contact with a first planar surface of the flat shim, and a second mating surface of the second flange may be in contact with a second planar surface of the flat shim.

A bleed system for an aircraft may comprising a first duct segment including a first flange, the first flange having a first recess, a flat shim configured to form a seal with the first flange, wherein the flat shim comprises a nickel-chromium-based superalloy, and a first E-seal located in the first recess and between the first flange and the flat shim.

In various embodiments, the bleed system may further comprise a second duct including a second flange. The second flange may have a second recess. A second E-seal may be located in the second recess. A mating surface of the first flange may be in contact with a first planar surface of the flat shim. The flat shim may be selected to have a thickness corresponding to a size of a gap between the first flange and the second flange. A bolt may be inserted through the first duct segment, the flat shim, and the second duct segment. The first duct segment may be coupled to an engine case in a gas turbine engine. The first seal may be in contact with a recessed face of the first flange and a first planar face of the flat shim.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for connecting duct segments are disclosed. Adjacent duct segments may comprise bolted flanges. The flanges may comprise a recess. A seal may be inserted in the recess of each flange. A gap between the adjacent duct segments may be measured. A flat shim may be selected based on the size of the gap. The flat shim may be inserted between the adjacent duct segments to bridge the gap resulting from the stack-up of manufacturing and assembly tolerances.

Figure 1:
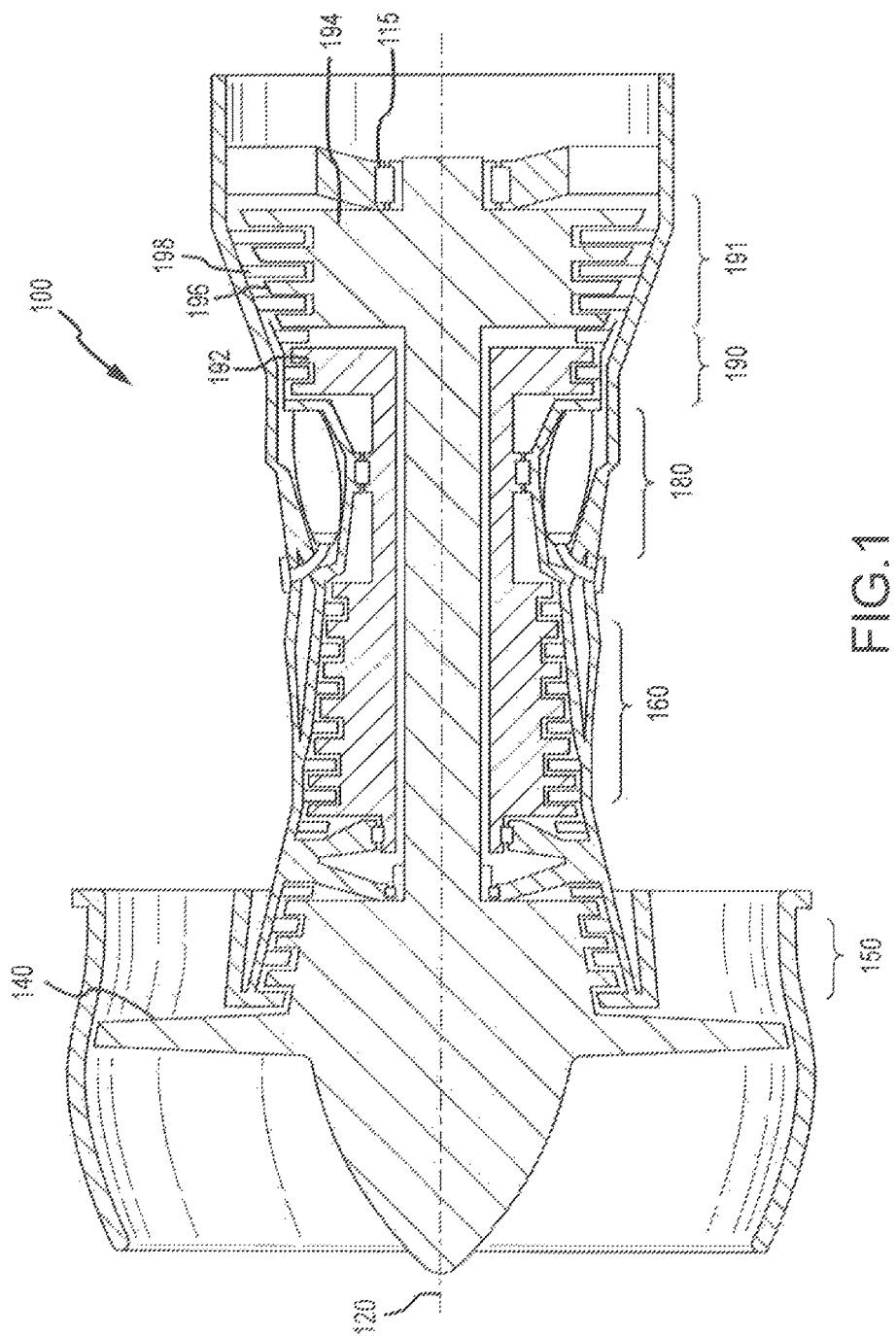
FIG. 1 illustrates a schematic cross-section view of a gas turbine engine in accordance with various embodiments.

Referring to FIG. 1, a gas turbine engine 100 (such as a turbofan gas turbine engine) is illustrated, according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across turbine sections 190, 191. Additionally, bleed air may be removed from the compressor sections 150, 160 through bleed ducts and used for various purposes such as anti-ice air for the engine inlet or wing leading edges, or to supply pressurized environmental air to the aircraft cabin. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
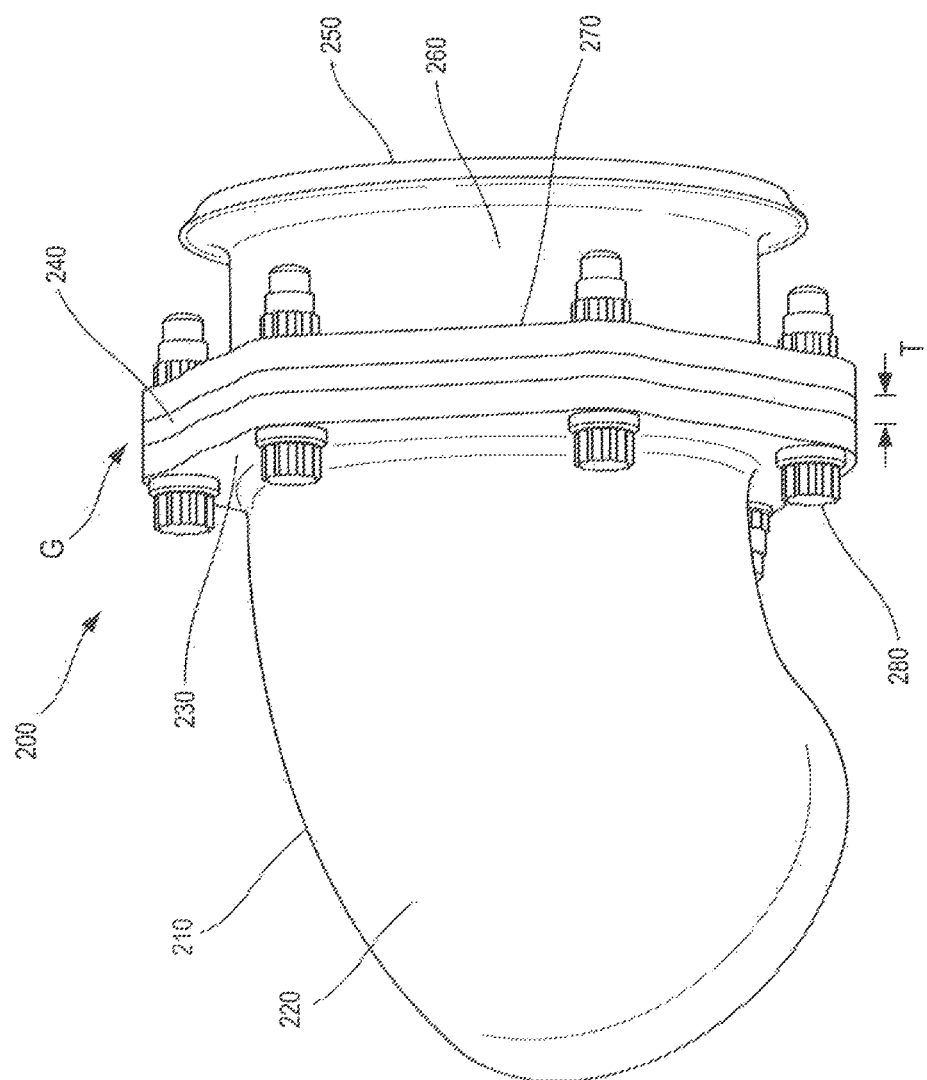
FIG. 2 illustrates a perspective view of a duct joint in accordance with various embodiments.

Referring to FIG. 2, a duct joint 200 is illustrated according to various embodiments. A first duct segment 210 and a second duct segment 250 may transmit hot, compressed bleed air from the compressor section of a gas turbine engine. The first duct segment 210 may comprise a first pipe 220 and a first flange 230, and the second duct segment 250 may comprise a second pipe 260 and a second flange 270. The first flange 230 and the second flange 270 may be separated by a gap G.

Due to manufacturing and assembly or installation tolerances, when the first duct segment 210 and the second duct segment 250 are installed in the engine, the gap G may be present between the first flange 230 and the second flange 270. Forcing the first flange 230 and the second flange 270 together to eliminate the gap G would create a preload on the first duct segment 210 and the second duct segment 250. The preload may limit the amount of thermal growth and deflections that the duct segments 210, 250 may withstand.

Inserting a flat shim 240 between the first flange 230 and the second flange 270 may decrease the preload applied to the duct segments 210, 250. The flat shim 240 is located in the gap G between the first flange 230 and the second flange 270. The bleed air in the duct segments may reach 1250° Fahrenheit (~676° C.) or greater. The flat shim 240 may comprise a material capable of withstanding high temperatures and pressures. The material may be a nickel-chromium-based superalloy, such as INCONEL®. The flat shim 240 may have a thickness T. The thickness T of the flat shim 240 may be selected to correspond to the size of the gap G at room temperature. Thus, after the duct segments 210, 250 have been installed, a thickness of a flat shim may be selected which may decrease the preload on the duct segments.

A plurality of bolts 280 may be inserted through the first flange 230, the flat shim 240, and the second flange 270. The bolts 280 may be tightened, and the first flange 230, the flat shim 240, the second flange 270, and two seals (shown in FIGS. 3-5) may seal the duct segments 210, 250.

Figure 3:
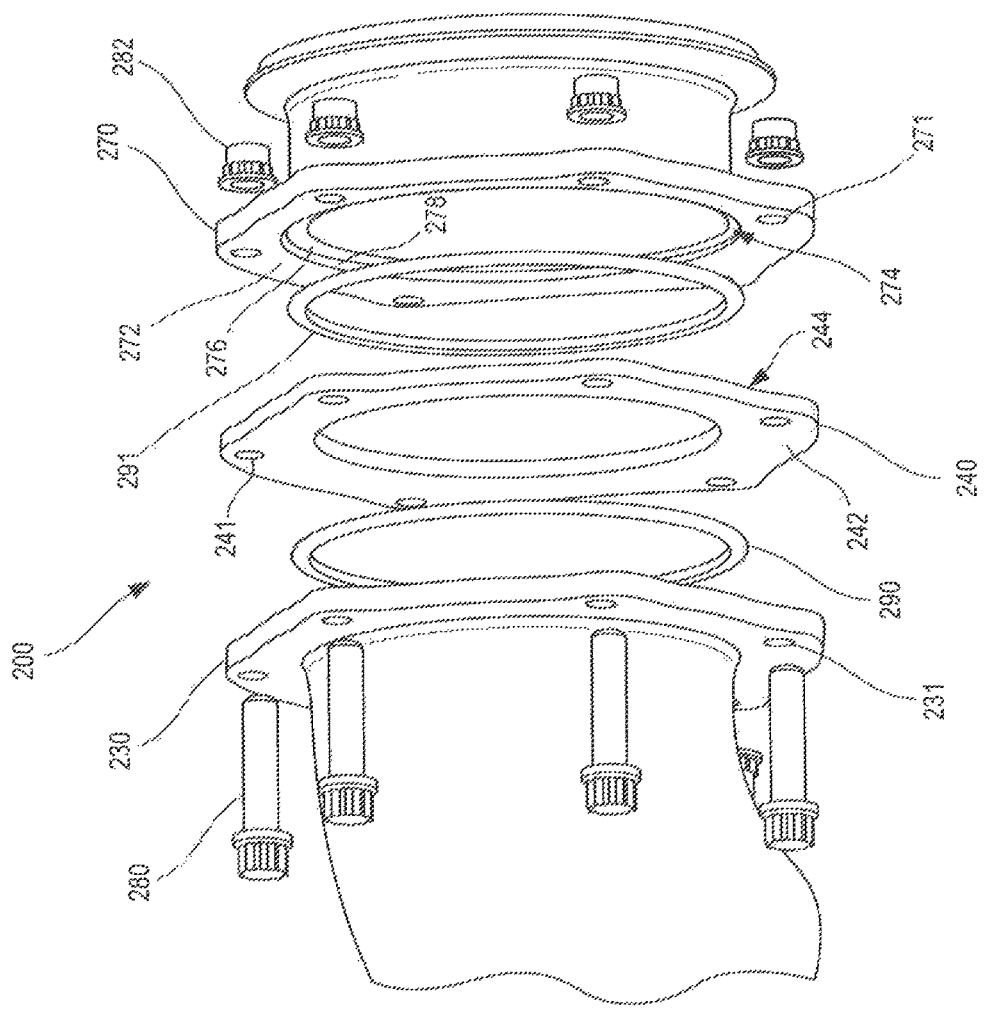
FIG. 3 illustrates an exploded view of the duct joint of FIG. 2.

Referring to FIG. 3, an exploded view of the duct joint 200 is illustrated according to various embodiments. The first flange 230 and the second flange 270 may each comprise a planar mating surface 272 and a recess 274. The recess 274 may be defined by a recessed surface 276 and an inner circumference 278. The duct joint 200 may comprise a first seal 290 and a second seal 291. The second seal 291 may be located within the recess 274 in the second flange 270, and the first seal 290 may be located within the recess in the first flange 230. In various embodiments, the seals 290, 291 may comprise an E-seal, such as an AS 1895 seal. E-seals may be annular and have a cross-section generally in the shape of an "E." The seals 290, 291 may comprise a high temperature material, such as INCONEL® or an age hardening austenitic nickel-based superalloy such as WASPALOY®. E-seals may have high flexibility and spring back characteristics, and thus may tolerate thermal growth and may also be reusable. The flat shim 240 may comprise a planar face 242, 244 on each side of the flat shim 240. The planar faces 242, 244 of the flat shim may contact the planar mating surfaces of 272 of the first flange 230 and the second flange 270. The planar faces 242, 244 of the flat shim may also contact the seals 290, 291. The first flange 230 may comprise first bolt holes 231, the flat shim 240 may comprise shim bolt holes 241, and the second flange 270 may comprise second bolt holes 271. The plurality of bolts 280 may be inserted through the bolt holes 231, 241, 271, and a plurality of nuts 282 may be used to tighten the bolts 280.

Figure 4:
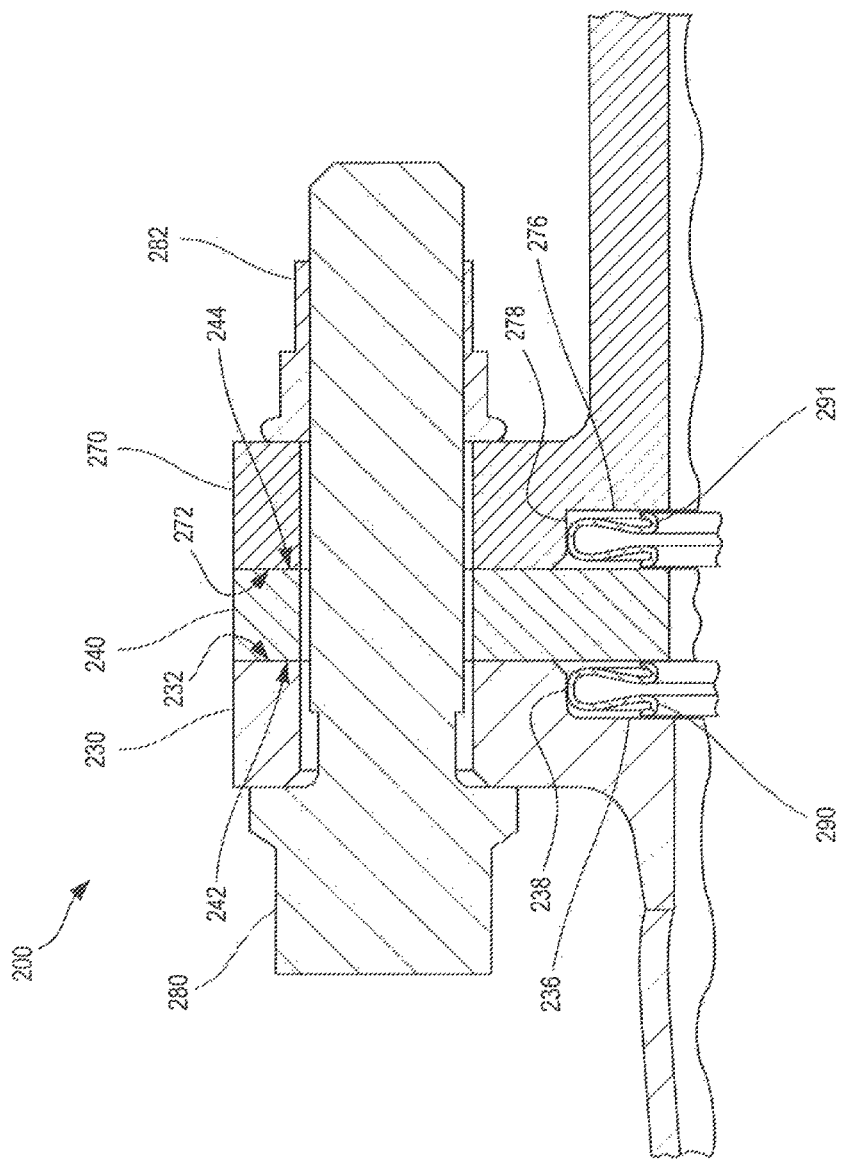
FIG. 4 illustrates a cross-section view of a portion of the duct joint of FIG. 2.
Figure 5:
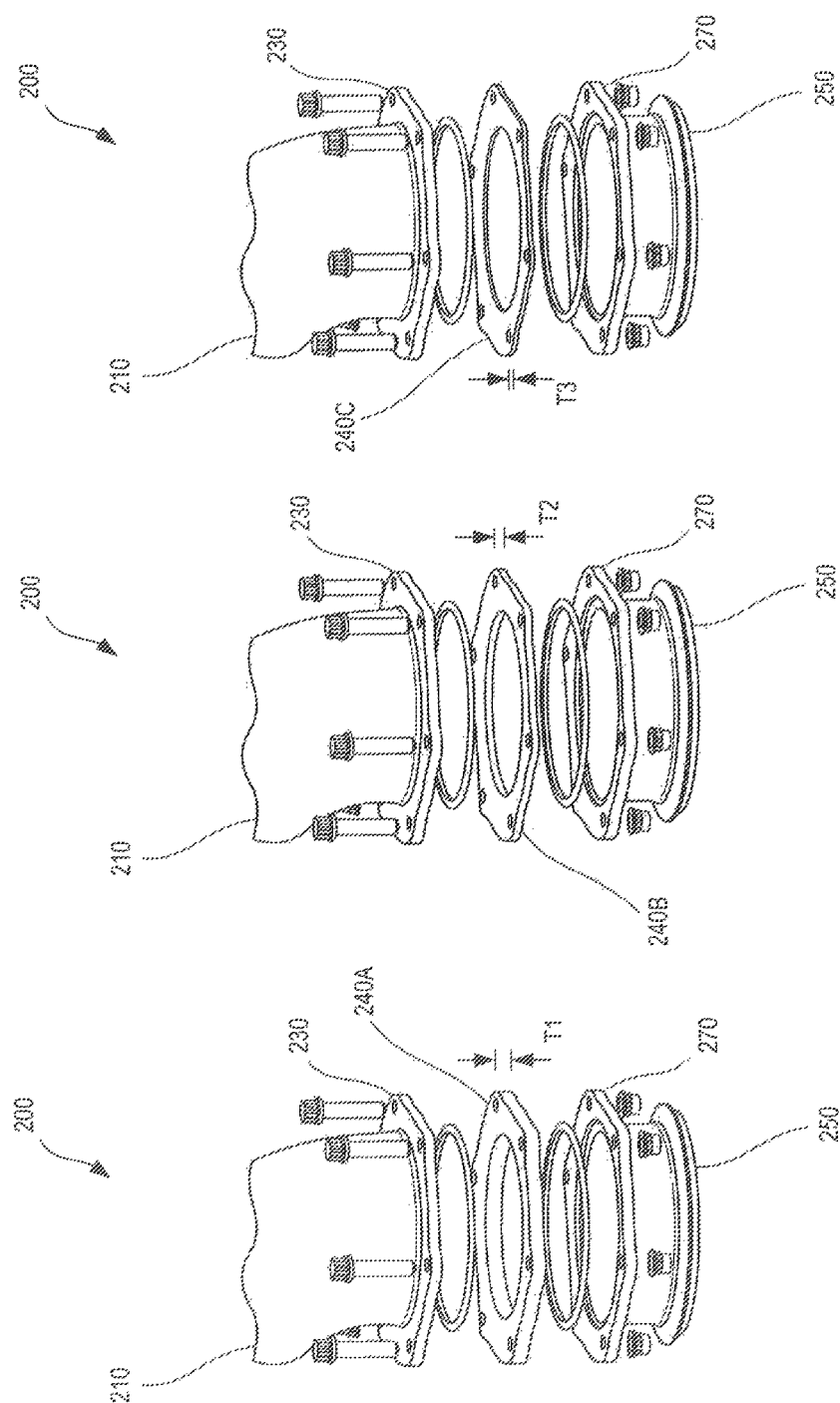
FIGS. 5A-5C illustrate exploded views of duct joints with flat shims of different thicknesses in accordance with various embodiments.

Referring to FIG. 4, a section view of a bolt 280 in the duct joint 200 is illustrated according to various embodiments. The first flange 230 may comprise the planar mating surface 232, the recessed surface 236, and the inner circumference 238. The second flange 270 may comprise the planar mating surface 272, the recessed surface 276, and the inner circumference 278. The flat shim 240 may be located between the first flange 230 and the second flange 270. The first seal 290 may be located in the first recess 234 and may contact the recessed surface 236 of the first flange 230, the inner circumference 238 of the first flange 230, and the first planar face 242 of the flat shim. Similarly, the second seal 291 may be located in the second recess 274 and may contact the recessed surface 276 of the second flange 270, the inner circumference 278 of the second flange 270, and the second planar face 244 of the flat shim 240. The planar mating surface 232 of the first flange 230 may contact the first planar face 242 of the flat shim 240, and the planar mating surface 272 of the second flange 270 may contact the second planar face 244 of the flat shim 240. The bolt 280 may be inserted through the first flange 230, the flat shim 240, and the second flange 270, and the nut 282 may tighten the bolt 280. As the bolt 280 is tightened, the first seal 290 may be partially compressed between the first flange 230 and the flat shim 240, and the second seal 291 may be partially compressed between the second flange 270 and the flat shim 240.

Referring to FIGS. 5A-5C, exploded views of the duct joint 200 with different thickness shims are illustrated according to various embodiments. After the first duct segment 210 and the second duct segment 250 are installed, the gap between the first flange 230 and the second flange 270 may be measured. Depending on the size of the gap, different sized flat shims may be selected. For example, in FIG. 5A, the gap between the first flange 230 and the second flange 270 may be the greatest of FIGS. 5A-5C, and the flat shim 240A having the largest thickness T1 may be selected and inserted between the first flange 230 and the second flange 270. In FIG. 5B, the gap may be smaller than that in FIG. 5A, and the elected flat shim 240B may have a medium thickness T2. In FIG. 5C, the gap between the first flange 230 and the second flange 270 may be the smallest of FIGS. 5A-5C, and the flat shim 240C having the smallest thickness T3 relative to T1 and T2 may be selected.

Prior to assembly of the duct joint 200, a variety of shims 240 may be prepared with varying thicknesses, the varying thicknesses addressing the most likely range of needs for the thickness of shim 240, driven by the varying gaps between duct flanges. Each of the shims 240 is simple in design, having two flat mating faces on each side, and do not require any special geometry to create the seal with the ducts. The shims 240 can be manufactured from sheet stock and cut to shape and drilled for the bolt holes. Thus, it would not be overly expensive to prepare a variety of shim sizes and supply them in a kit to the installer of the duct system. Also, the flanges on the ducts and the seals do not need to change with varying thicknesses of the shim 240. The shim 240 is the only varying part in the combination of parts needed to permit a duct joint with a varying gap between the ducts. As a further advantage, the seal design may perform reliably in the application with no impact in sealing performance created by the varying thicknesses of the shim 240.

Figure 6:
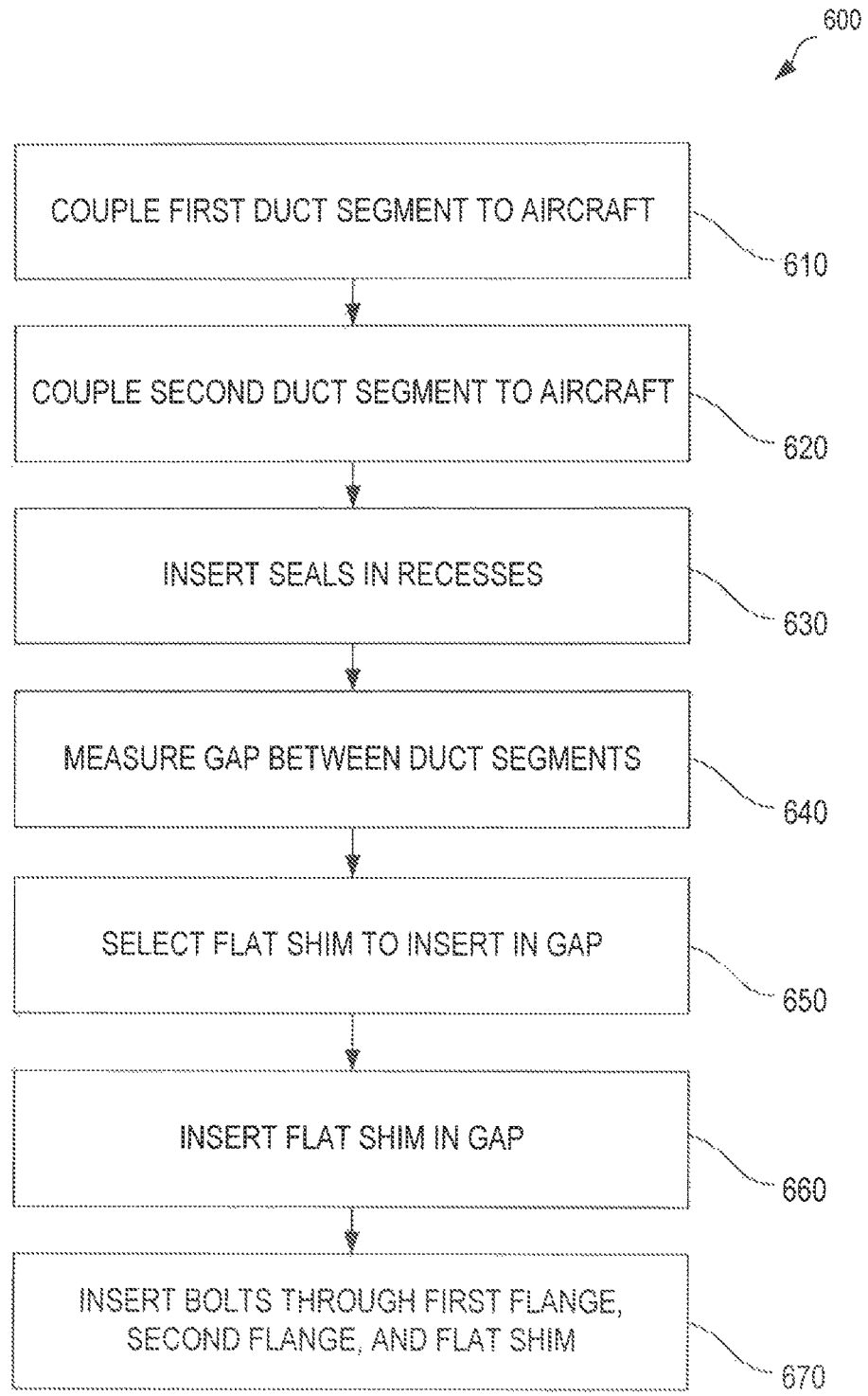
FIG. 6 illustrates a process for coupling two duct segments together in accordance with various embodiments.

Referring to FIG. 6, a process 600 for coupling duct segments is illustrated according to various embodiments. A first duct segment may be coupled to a first portion of an aircraft (step 610). The first portion of the aircraft may be any portion of the aircraft, such as a low pressure compressor case, a high pressure compressor case, a wing, a pylon, another duct segment, or any other suitable portion of the aircraft. A second duct segment may be coupled to a second portion of the aircraft (step 620). The second portion of the aircraft may be any portion of the aircraft, such as a low pressure compressor case, a high pressure compressor case, a wing, a pylon, another duct segment, or any other suitable portion of the aircraft. In various embodiments, the first duct segment or the second duct segment may be a portion of an engine case. A first seal may be inserted into a recess in the first flange, and a second seal may be inserted into a recess in the second flange (step 630).

A gap may be measured between a first flange of the first duct segment and a second flange of the second duct segment (step 640). A flat shim may be selected to be inserted into the gap (step 650). In various embodiments, flat shims of various standard thicknesses may be available. A flat shim having a thickness closest to the size of the gap may be selected. In various embodiments, the flat shim having the greatest thickness which is less than the size of the gap may be selected. The flat shim may be inserted into the gap (step 660). One or more bolts may be inserted through the first flange, the flat shim, and the second flange (step 670). The bolts may be tightened, and the first flange, the flat shim, and the second flange may form a duct joint which seals the first duct segment to the second duct segment.

Although described primarily herein with reference to high temperature applications in aircraft, the systems and methods described herein may be utilized to couple any ducting comprising bolted flanges.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A duct joint comprising:
a first duct segment configured to connect to a compressor of a gas turbine engine including a first flange, the first flange having a first recess surface and a first inner circumference;
a second duct segment including a second flange, the second flange having a second recess surface and a second inner circumference;
a flat shim comprising a first flat planar face and a second flat planar face, wherein the flat shim is located between the first flange and the second flange, wherein the first flat planar face is in direct contact with the first flange, and wherein the second flat planar face is in direct contact with the second flange;
a bolt extending through the first flange, the flat shim, the second flange;
a first E-seal in contact with the first recess surface, the first inner circumference, and the first flat planar face, wherein the first seal forms a sealing engagement between the first flange and the flat shim; and a second E-seal in contact with the second recess surface, the second inner circumference, and the second flat planar face, wherein the second seal forms a second sealing engagement between the second flange and the flat shim.

2. The duct joint of claim 1, wherein a first mating surface of the first flange is in direct contact with the first flat planar face of the flat shim.

3. The duct joint of claim 2, wherein a second mating surface of the second flange is in direct contact with the second flat planar face of the flat shim.

4. The duct joint of claim 1, wherein a thickness of the first flange corresponds to a gap between the first flange and the second flange.

5. The duct joint of claim 1, wherein the the second duct segment is coupled to an engine case in the gas turbine engine.

6. The duct joint of claim 1, wherein the flat shim comprises a nickel-chromium-based superalloy.

7. The duct joint of claim 1, wherein a first mating surface of the first flange is in direct contact with the first flat planar face of the flat shim, and wherein a second mating surface of the second flange is in direct contact with the second flat planar face of the flat shim.

8. A bleed system for an aircraft comprising:
a first duct segment configured to connect to a compressor of a gas turbine engine including a first flange, the first flange having a first recess surface and a first inner circumference;
a flat shim comprising a first flat planar face and configured to form a seal with the first flange, wherein the flat shim is in direct contact with the first flange;
a bolt extending through the flat shim and the first flange; and
a first E-seal in contact with the first recess surface, the first inner circumference, and the first flat planar face, wherein the first E-seal creates a sealing engagement between the first flange and the flat shim.

9. The bleed system of claim 8, further comprising:
a second duct segment including a second flange, the second flange having a second recess; and
a second E-seal located in the second recess.

10. The bleed system of claim 8, wherein a first mating surface of the first flange is in direct contact with the first flat planar face of the flat shim.

11. The bleed system of claim 9, wherein the flat shim is selected to have a thickness corresponding to a size of a gap between the first flange and the second flange.

12. The bleed system of claim 9, wherein the bolt is inserted through the first duct segment, the flat shim, and the second duct segment.

13. The duct joint of claim 1, wherein the flat shim consists of sheet stock.

14. The bleed system of claim 8, wherein the flat shim consists of sheet stock.

15. The bleed system of claim 8, wherein the flat shim wherein the flat shim comprises a nickel-chromium-based superalloy.

* * * * *